United States Patent
Stimpfl

[19]

[11] Patent Number: 6,102,187
[45] Date of Patent: Aug. 15, 2000

[54] DEVICE FOR THE ALIGNING OF OBJECTS

[76] Inventor: Christopf Stimpfl, Hoferweg 2, D-88267 Vogt, Germany

[21] Appl. No.: 08/992,554

[22] Filed: Dec. 17, 1997

[30] Foreign Application Priority Data

Dec. 21, 1996 [DE] Germany ............................ 196 53 843
Jul. 3, 1997 [DE] Germany ............................ 197 28 402

[51] Int. Cl.⁷ .................................................. B65G 47/24
[52] U.S. Cl. .......................... 198/415; 198/396; 198/382; 53/444; 53/459; 99/386; 99/443 C
[58] Field of Search ............................. 198/396, 415, 198/416, 455, 382, 836.2; 53/444, 459; 99/386, 443 C

[56] References Cited

U.S. PATENT DOCUMENTS

| | | | |
|---|---|---|---|
| 1,341,238 | 5/1920 | Mason ..................................... | 198/415 |
| 2,637,433 | 5/1953 | Shuttleworth ........................... | 198/415 |
| 4,058,201 | 11/1977 | Etzold ..................................... | 198/382 |
| 4,376,481 | 3/1983 | Franklin .................................. | 198/396 |
| 5,417,265 | 5/1995 | Davenport et al. .................. | 198/836.2 |
| 5,871,080 | 2/1999 | Manzi et al. ............................ | 198/396 |
| 5,893,259 | 4/1999 | Posge ....................................... | 53/444 |

*Primary Examiner*—Christopher P. Ellis
*Assistant Examiner*—Mark A. Deuble
*Attorney, Agent, or Firm*—Bachman & LaPointe, P.C.

[57] ABSTRACT

In a device for aligning objects, particularly sausages (1), which are fed for instance to a packaging device (7), at least two elements (14, 15) moving opposite each other are arranged approximately parallel to each other. They leave between them a space (16, 17) through which the objects (1) can drop.

27 Claims, 7 Drawing Sheets

DEVICE FOR THE ALIGNING OF OBJECTS

The present invention relates to a device for the aligning of objects, in particular sausages, which are fed, for example, to a packaging device.

The handling of sausages after their preparation still gives rise to considerable problems. From DE-OS 43 07 637, a device is known for separating sausages, for instance, from a string of sausages which, behind the cutting device proper, enter a sorting station and are sorted there in accordance with their length.

DE-OS 13 31 238 shows a device in which sausages are inserted by a bucket wheel into corresponding packaging shells.

From DE-OS 44 25 512 a device is known in which sausages are collected and inserted into a bottle or a jar.

DE-OS 195 07 443.2 relates, for instance, to a sausage-folding device in which the sausages are folded in pairs in front of the packaging device.

In many cases of the industrial production and packaging of sausages, it is, however, necessary for the sausages to be aligned accurately. This is still done today in most cases by hand, which is extremely time-consuming.

The object of the present invention is to automate the aligning of objects, particularly sausages, and considerably facilitate it.

In order to achieve this goal, at least two elements which move in opposite directions are arranged approximately parallel to each other and leave between them a space for the objects to drop through.

Due to the fact that the elements move in opposite direction, the objects are automatically brought into a direction in which their axes are parallel to each other. This is done without an additional worker being required.

The elements which move in opposite direction to each other can be of any desired shape and development. For instance, they could be grids with prongs which move back and forth in opposite direction. Elements which always move in the same direction are, to be sure, preferred, so that in every case the objects are stripped off.

In a preferred embodiment, endless belts or chains are used which are conducted over reversing rollers. In this way, the individual chain elements always retain the same direction of movement, the direction of movement being, to be sure, in opposite direction. A plurality of chains can also be arranged alongside of each other since, even if all chains are driven by a single drive, the chain elements always carry out alternately an opposite direction of movement.

The chains furthermore have the advantage that they form a relatively small resting surface for a sausage, so that even slight movement of the chains effects a stripping-off of the sausages.

The sausages drop between or alongside the chain elements into a space which is defined by shaft walls. The purpose of the shaft walls is to feed the sausages to another conveyor belt to which the sausages are then fed with their axes parallel to each other or aligned in the direction of conveyance, to, for instance, a following conveyor belt. In order that the sausages retain their direction on the first conveyor belt, their sides should be covered with elevated edge ledges.

So that the sausages are imparted the desired alignment at the place of transfer from the two conveyor belts, arranged for instance perpendicular to each other, a front end region of the conveyor belt which feeds the sausages should have an additional pressing roll. It extends above the conveyor belt so that the sausage leaves the slot between conveyor belt and pressing roll first of all at the rear end. Since, furthermore, the conveyor belt which delivers the sausage is inclined, this has the result that the sausage drops relatively horizontally onto the following conveyor belt.

Another part of the present invention refers to a special packaging device in which sausages which pass approximately perpendicular to the direction of packing into a packaging device are introduced in said packaging device into a packing means, for instance a plastic bag. The aligning device described above is preferably associated with such a packaging device, but another aligning device can also be used.

One example of another or an additional device for the aligning of the sausages has two belts leaning against each other in the direction of transportation, between which belts the sausages are conducted transverse to the direction of transport. In other words, these belts grip the sausage in each case at their ends and align them. For this reason, both belts should be driven, since the conveyor belt on which the sausages lie also continues to travel.

After the alignment, the sausages come into a collecting station. This collecting station has the purpose of separating a desired number of sausages and stopping the following sausages. For this purpose, a vertically movable pusher against the following sausages is provided, the pusher, together with a swingable flap, forming a receiving space for the desired number of sausages. If these sausages are to be removed from the space, the swinging out of the flap is sufficient, and the above-mentioned conveyor belt takes the sausages out of the space, while the following sausages are still held by the pusher.

From the space of the collecting station, the sausages, in a preferred embodiment of the invention, pass onto a transfer table which brings the sausages to a packaging device. This transfer table preferably extends below the conveyor belt and is itself movable in the direction of conveyance. For this purpose, on a carriage which is movable in the direction of conveyance there is plate on which two ledges are provided between which the sausages lie. One ledge is fixed, while the other ledge is displaceable vertically, so that the sausages, as soon as the transfer table is above the packaging device, can be stripped off from the plate and drop into a collecting trough of the packaging device. An automatic opening of the front ledge of the transfer table is made possible by an interaction of swing linkages and cams.

In another possibility for a collecting station, an endless belt is conducted approximately in a triangle over corresponding deflection rollers. In this way, an ascent plane and a descent plane are produced for the sausages. On the one side, this collecting station is adjacent to the conveyor belt. On the other side, the endless belt delivers the sausages into a shaft. The sausages then fall directly from said shaft into the collecting trough of the packaging device.

Since the number of sausages which are introduced into the shaft is to be determined by corresponding clamping devices, there are associated with the shaft on the one hand sensors and on the other hand clamping devices which move the endless belt out of the shaft at a desired height.

In the packaging device, the sausages are collected on a tray in the collecting trough, the sausages still lying, as before, transverse to the direction of conveyance. They are now to be ejected into a package, in particular into the plastic bag mentioned above, so that they can stand vertically in the plastic bag. For this purpose, there is associated with the collecting trough a pusher which pushes the sausages through a slot between two shells into the plastic bag, the plastic bag being pushed over the shells.

The collecting trough is limited on top by a vertically displaceable cover so that sausages cannot drop in undesired manner out of the collecting trough.

Further advantages, features and details of the invention will be evident from the following description of preferred embodiments and from the drawing; in the drawing

Figure 1:
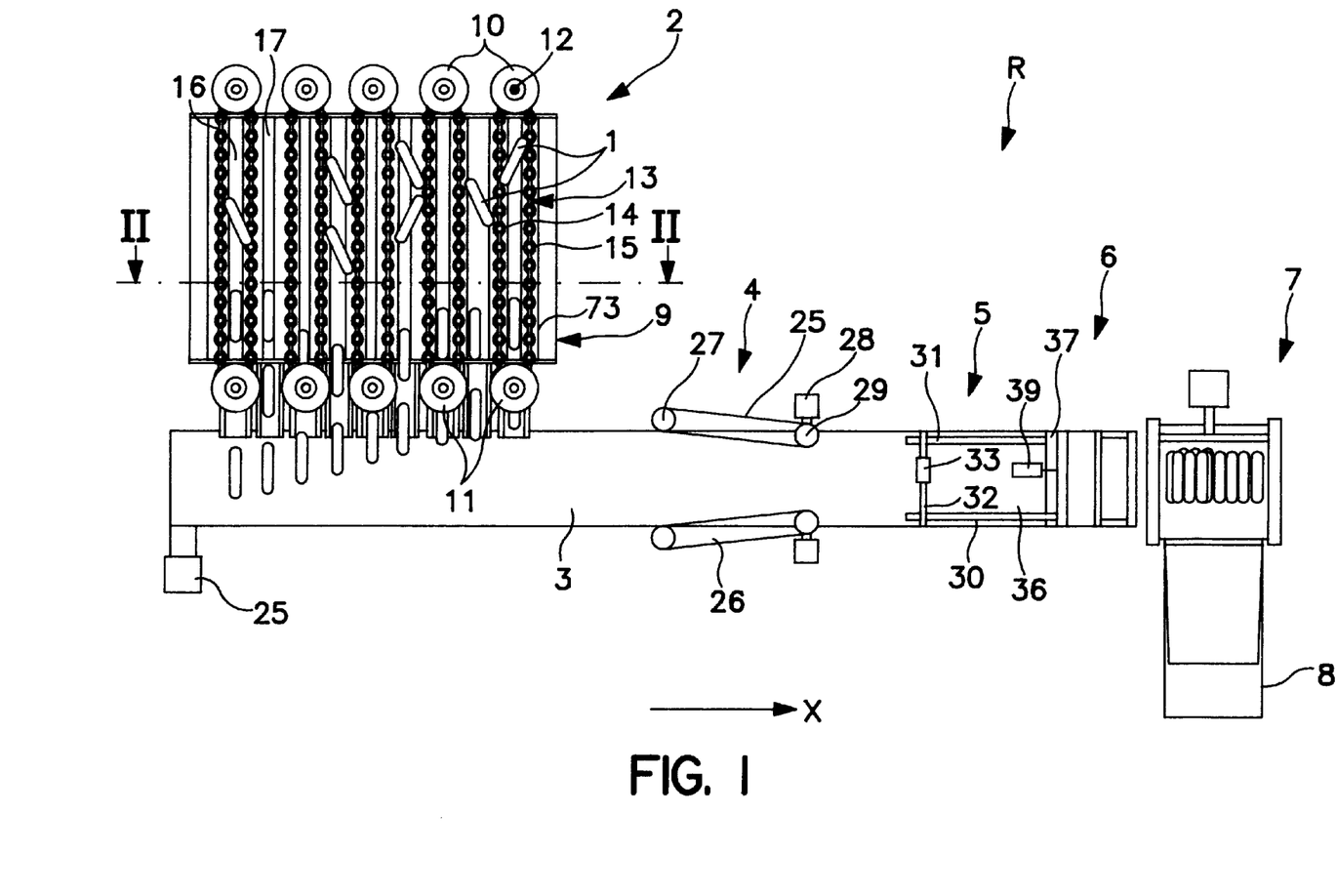
FIG. 1 is a top view of a device in accordance with the invention for the aligning of sausages which are fed to a packaging device.

In accordance with FIG. 1, a plant R in accordance with the invention for the aligning of sausages has an alignment device 2, a conveyor belt 3, a device 4 for the end alignment of the sausages 1, a collecting station 5, a transfer table 6, and a packaging device 7. By this plant R, the sausages 1 are transferred into a package, in particular into a plastic bag 8. In this connection, the sausages 1 pass standing vertically into the plastic bag 8.

The alignment device 2 has a frame 9 on which opposite reversing rollers 10 and 11 are arranged. The rollers 10 and 11 turn in each case around a vertical shaft 12, these vertical shafts 12 (not shown in detail) being preferably driven jointly.

Every two opposite rollers 10 and 11 are wrapped around by an endless chain 13, the chain elements 14 and 15 which are arranged parallel to each other moving in opposite directions to each other.

A space 16 between two chain elements 14 and 15 of an endless chain 13, as well as a space 17 between two adjacent endless chains is surrounded by shaft walls 18 (FIG. 2), which serve to conduct the sausages 1 to, in each case, a transport belt 19. Each transport belt 19 has laterally elevated edge ledges 20 which form a receiving trough 21 between each other for the sausages 1.

A plurality of transport belts 19 wrap around a common drive shaft 22 which is connected to a drive, not shown in detail.

The manner of operation of the alignment device 2 is as follows:

Sausages pass for instance from a feed storage onto the endless chains, as indicated in FIG. 1. The chain elements 14 and 15 move in opposite direction upon rotation of the rollers 10 and 11 respectively. In this way, the sausages 1 are aligned in the direction of these chain elements 14 and 15 and drop from the chain elements 14 and 15 into the spaces 16 and 17 respectively, they being guided by the shaft walls 18.

Figure 2:
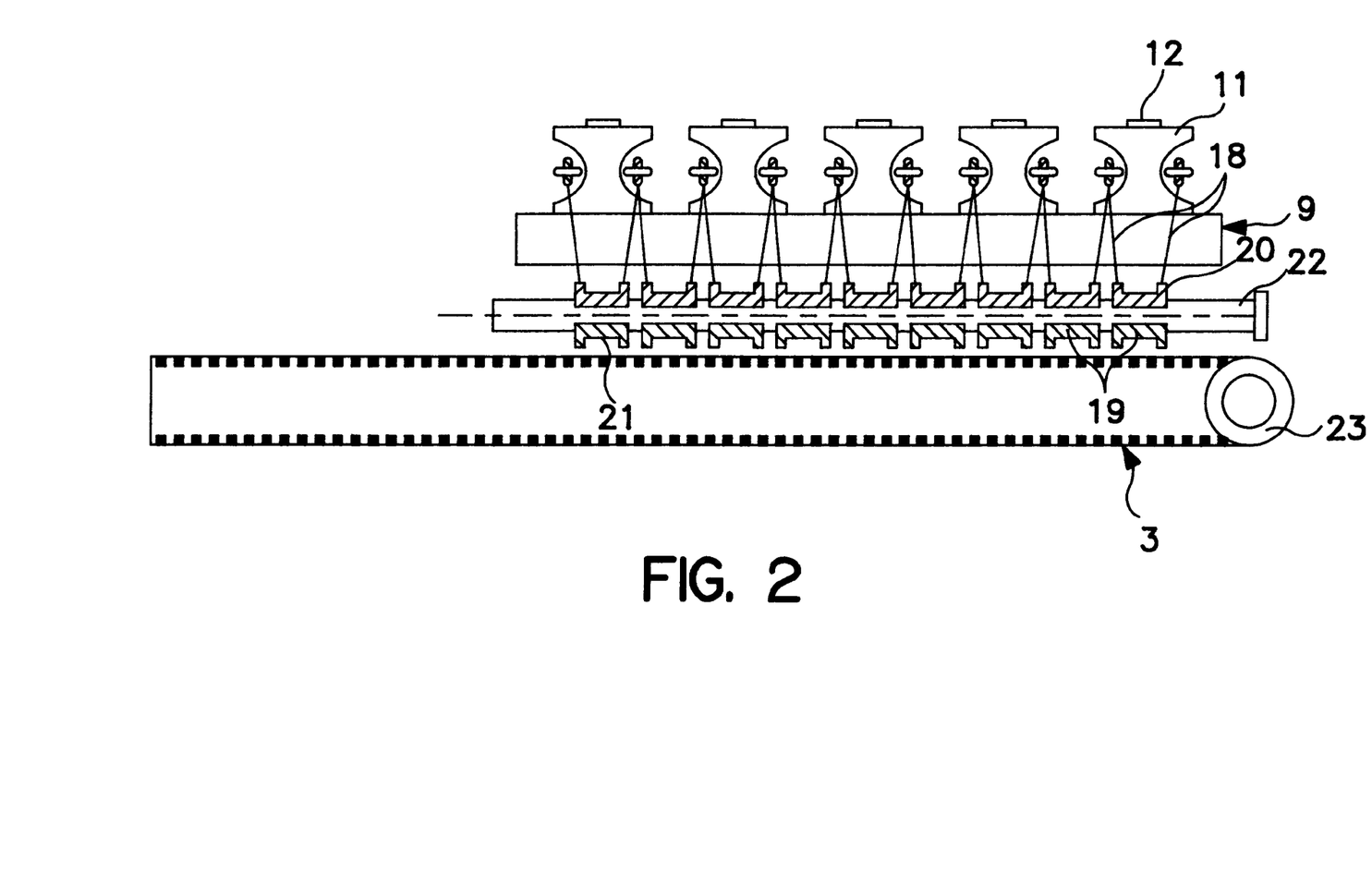
FIG. 2 is an enlarged cross section through the alignment device along the line II—II of FIG. 1.

The shaft walls 18, as can be noted in particular from FIG. 2, terminate directly above the transport belt 19, so that the sausages drop into the receiving trough 21 which is limited by the edge ledges 20. In this way, the sausages from adjacent transport belts 19 are aligned parallel to each other and arrive, thus aligned parallel to each other, also on the main conveyor belt 3.

The frame 9 is preferably arranged at such a height that should two sausages lie one above the other on the transport belt 19, the frame would strip the upper sausage off. Instead of the frame 5, a separate vertically adjustable stripper plate could also be provided.

Furthermore, it might happen that a sausage lies on at least three chain elements, two of them lying in the same direction and carrying the sausage along with them without it being turned. In order to prevent this, strippers of different length, indicated in dashed line, are provided over the chain elements 14, 15.

Figure 3:
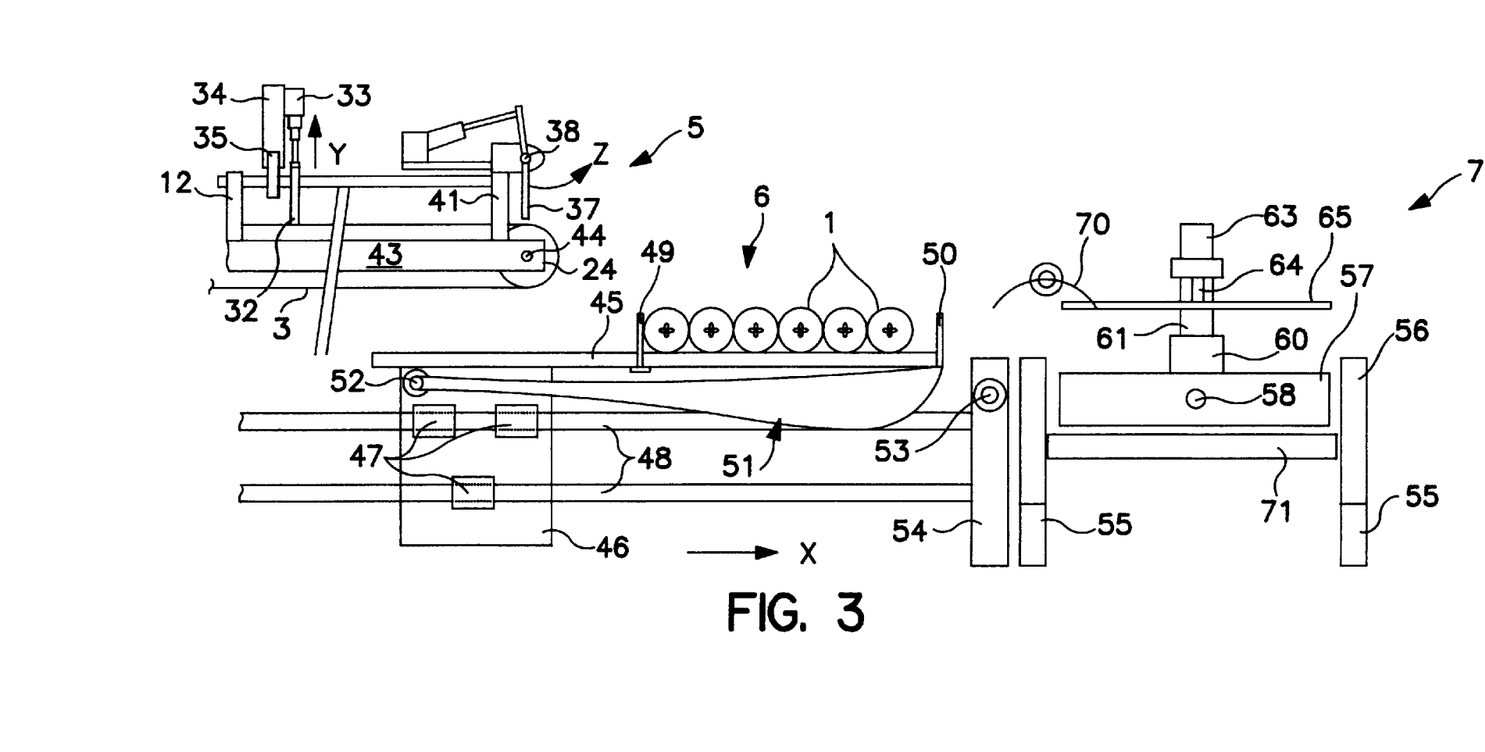
FIG. 3 is a diagrammatically shown side view of individual means of the device of FIG. 1.

The conveyor belt 3 wraps at one end around a roller 23 (see FIG. 2) and at the other end around a roller 24 (see FIG. 3). In the present embodiment a drive 72 is associated with the roller 23. Furthermore, the conveyor belt 3 is developed as a toothed belt, as can be noted from FIG. 2.

In the direction of conveyance x, the alignment device 2 is followed by the device for the aligning of the ends of the sausages 1. The sausages 1 are transported transverse to the direction of conveyance x by the device 4, the device 4 consisting preferably of two endless belts 25 and 26, which wrap around two rollers 27 and 28 respectively. A drive 29 is associated with each roller 28.

In particular from FIG. 1, it can be noted that the two endless belts 25 and 26 extend inclined towards each other in the direction of transport x. When the sausages 1 come into the region of these two endless belts 25 and 26, these sausages are aligned with respect to each other. In order that there be no displacement of the sausages 1, it might prove advisable for the endless belts 25 and 26 to travel with a speed similar to that of the conveyor belt 3.

The device 4 for the endwise alignment of the sausages 1 is followed by the collecting station 5, into which the sausages 1 can enter. For this, a pusher 32 which can be moved in vertical direction y is provided for this purpose on two guide rods 30 and 31. The moving of the pusher 32 is effected by a pneumatic cylinder 33 which rests against a support plate 34 which is seated on a pusher ledge 35. The pusher ledge 35 is displaceable along the guide rods 30 and 31 so that a space 36 for receiving the sausages 1 can be displaced between the pusher 32 and a swingable flap 37.

The swingable flap 37 turns in the direction z around a shaft 38, it opening the space 36. The rotation of the shaft 38 is again effected by a pneumatic cylinder 39, which is arranged on a mount 40.

The elements of the collecting station described up to now rest via corner posts 41 and 42 on support frames 43 which extend along the conveyor belt 3 and, for instance, also hold a shaft 44 of the roller 24.

The collecting station 5 is associated with the above-mentioned transfer table 6, which has a plate 45 arranged on a carriage 46. The carriage 46 has ball sleeves 47 over which the carriage 46 slides along bars 48.

Sausages 1 lie between two ledges 49 and 50 on the plate 45. The ledge 49 is displaceable along the plate 45 so that the distance between the ledges 49 and 50 and thus the receiving space between them can be changed. The ledge 50 on the other hand is connected on both sides with a swing linkage 51 which can turn in each case around a rotary joint 52 which is present on the carriage 46. Associated with this swing linkage 51 there is a cam 53, and, upon the sliding of the swing linkage 51 on the cam 53, the swing linkage 51, and thus the ledge 50, is lifted and releases the sausages 1 present between the ledges 49 and 50. The cam 53 is located on a side post 54 on which the bars 50 are also fastened.

Figure 4:
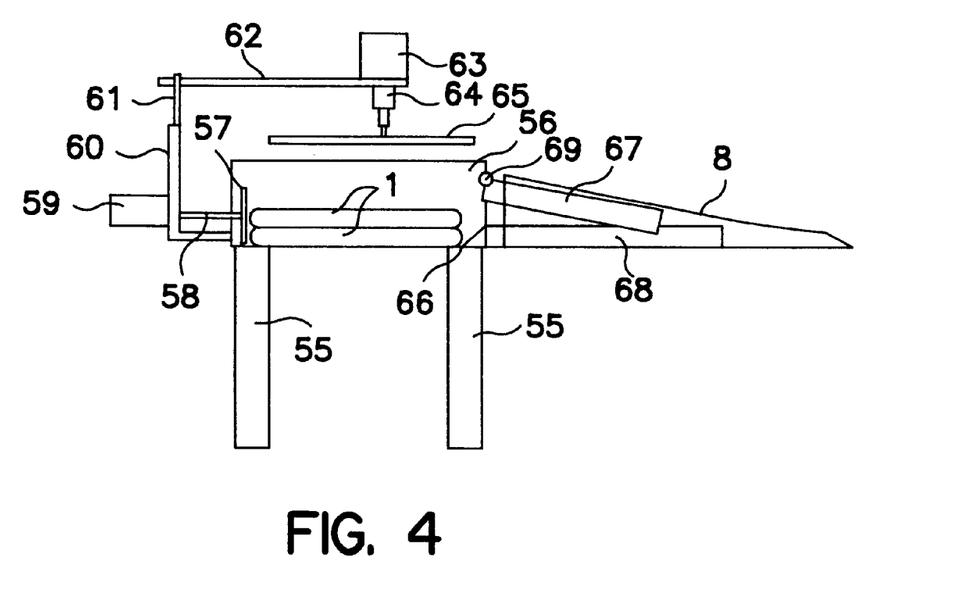
FIG. 4 is an enlarged view of the packaging device in the direction of conveyance.

The packaging device 7, which is shown in further detail in FIGS. 3 and 4, adjoins the side posts 54. On the side posts 55 there rests a collecting trough 56 which serves to receive the sausages 1. These sausages 1 pass, transverse to the direction of transport x, into said collecting trough 56. They can also be stacked one above the other as described further below.

The collecting trough 56 has associated with it a pusher 57 which is movable transverse to the direction of transportation x, the pusher being connected by a piston rod 58 to a pneumatic cylinder 59. The pneumatic cylinder 59 is arranged on a holding angle 60, from which there extends a strut 61 on which a boom 62 is fastened. On the boom 62 there is another pneumatic cylinder 63 which, by its piston rod 64, can raise or lower a cover 65.

Opposite the pusher 57 there is present in the collecting trough 56 a slot 66 through which the sausages 1 can be pushed between two shells 67 and 68. The shell 67 is in this connection connected via a joint 69 with the collecting trough 56 so that the shell 67 can be raised and lowered with respect to the shell 68. The plastic bag 8 is placed over the two shells 67 and 68.

The manner of operation of the parts of the installation last described is as follows:

After the endwise alignment of the sausages in the device 4, they pass, when the pusher 32 is raised, into the space 36 of the collecting station 5. Delivery of the sausages from the space 36 is prevented by the flap 37. However, since the conveyor belt 3 continues to move, the following sausages are backed-up in front of the flap 37 and also in front of the pusher 32, which has now been let down.

If a predetermined number of sausages 1 is now to enter the collecting trough 56, the flap 37 is opened, the plate 45 of the transfer table 6 being below the conveyor belt 3. The sausages can now pass out of the space 36 of the collecting station 5 onto the plate 45 between the ledges 49 and 50.

The carriage 46 moves the plate 45 to the collecting trough 56, the swing linkages 61 riding on the cams 63 and thus releasing the sausages 1 on the plate 45 of the transfer table 6. At this time, the plate 45 is already above the collecting trough 56 so that the sausages drop into the collecting trough 56. Upon the rearward movement of the plate 45, the stripping of the sausages from said plate 45 is further assisted by a rotary flap 70 which engages behind the last sausage.

In this way, not merely a single layer of sausages but several layers can be brought into the collecting trough, it being possible to lower a tray 71 of the collecting trough 56.

If the desired number of sausages is present in the collecting trough, the pusher 57 is placed in operation and pushes the sausages 1 through the slot 66 into the plastic bag 8. In this connection, the sausages are guided between the two shells 67 and 68, the shell 67 resting loosely on the top layer of sausages, whereby a canting or breaking out of the sausages is prevented.

Figure 5:
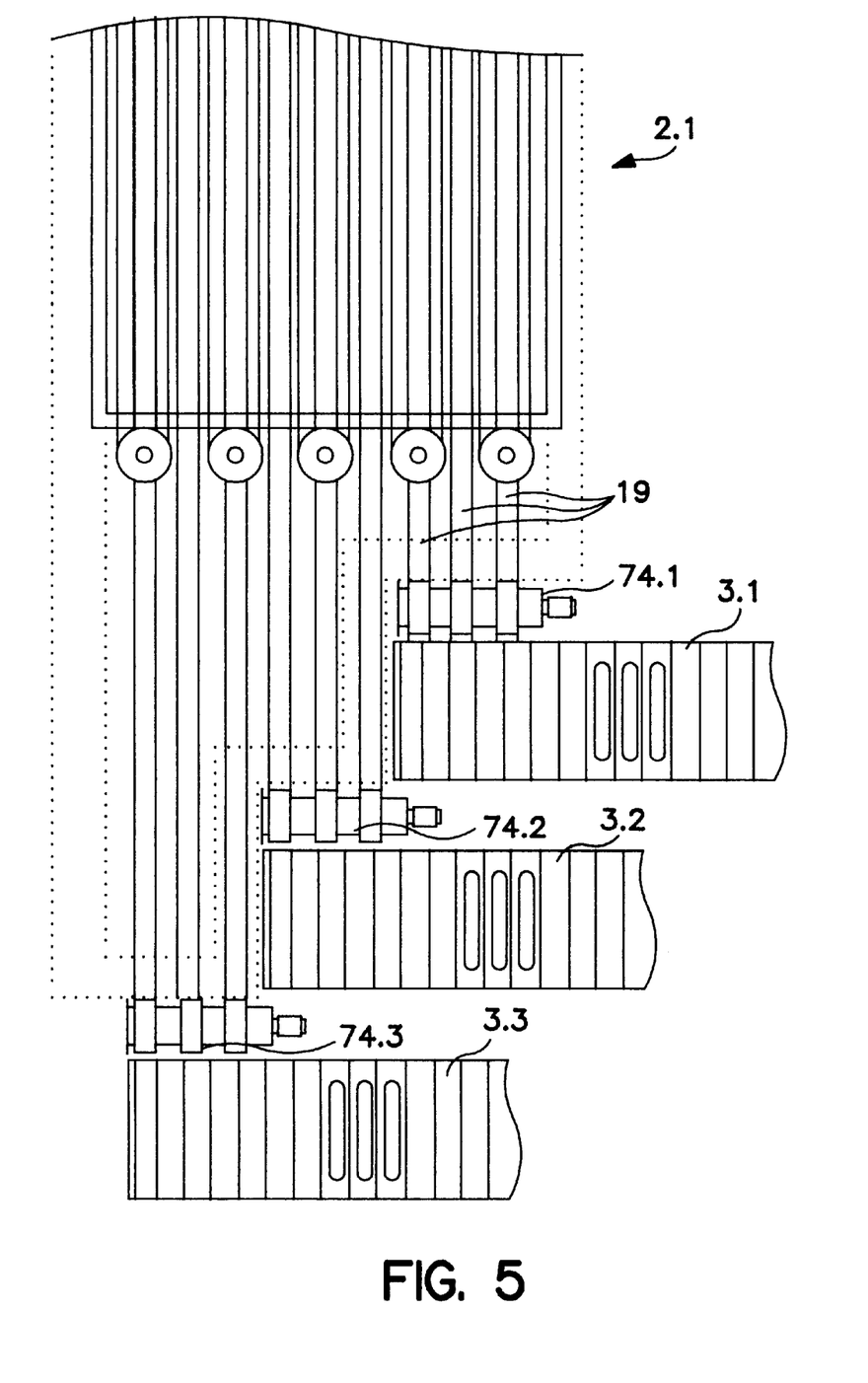
FIG. 5 is an enlarged top view of a further embodiment of a part of the device for the alignment of sausages.
Figure 6:
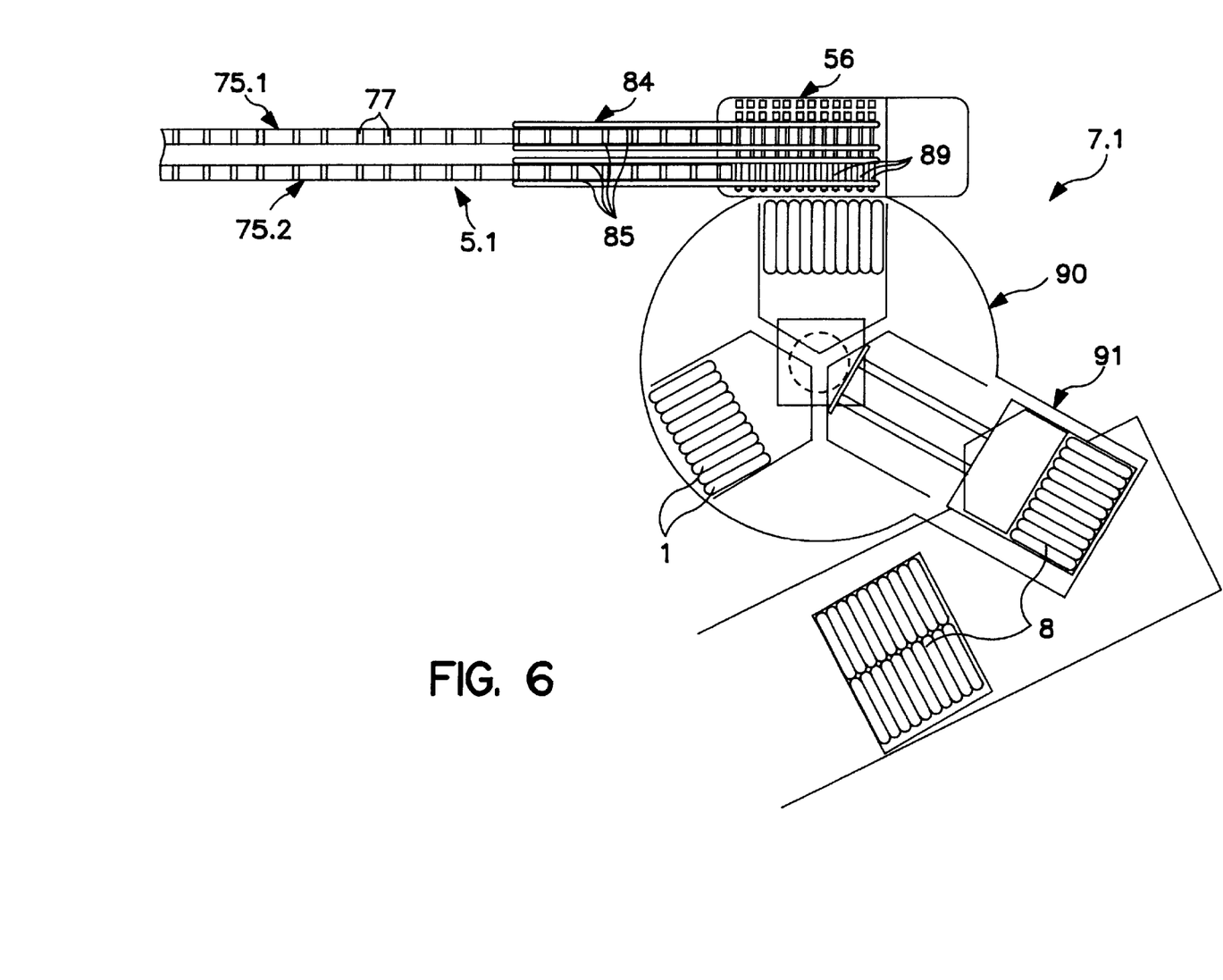
FIG. 6 is an enlarged top view of an embodiment of a collecting device followed by the packaging device.
Figure 7:
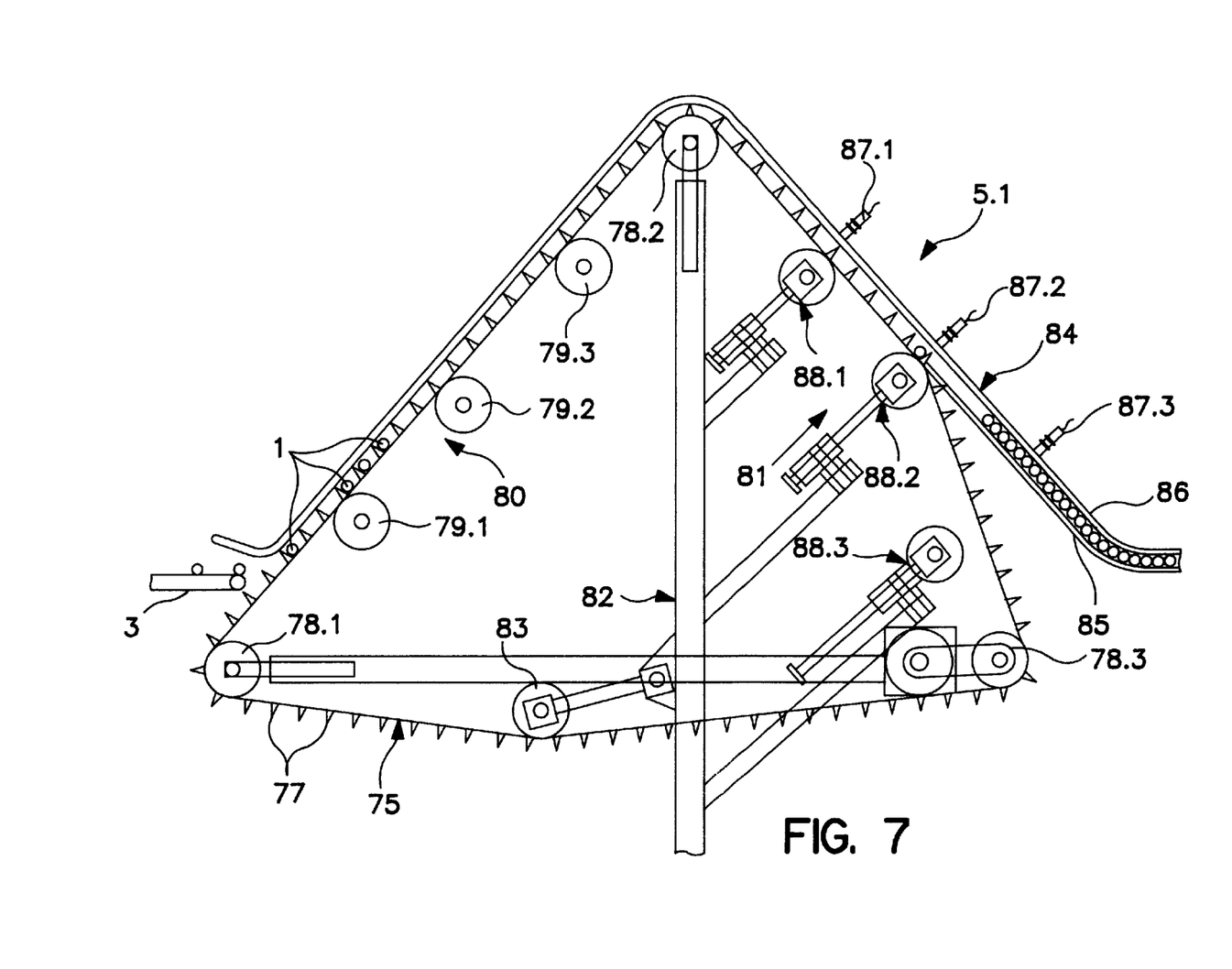
FIG. 7 is a side view of the collecting device according to FIG. 6.

Further embodiments of the device of the invention for the aligning of sausages which are fed to a packaging device are shown in FIGS. 5 to 7. In accordance with FIG. 5, the conveyor belts 19 are of different length so as, in this way, to be able to use a plurality of further conveying transport belts 3.1 to 3.3. In this connection, pressing rolls 74.1 to 74.3 are associated with the end regions of the conveyor belts 19 shortly before the transfer to the conveyor belts 3.1 to 3.3, the pressing rolls extending over the conveyor belts 19. At the same time, the entire alignment device is inclined obliquely upwards towards the conveyor belts 3.1 to 3.3 so that the sausages rise upward on the conveyor belts 19. At the end of the conveyor belts 19, the sausages pass between the conveyor belt 19 and the corresponding pressing rolls 74.1 to 74.3 and are held until one end of the sausage is released. In other words, the sausage also extends obliquely upwards over the conveyor belt 3.1 to 3.3 shortly before it is released. It then drops downward onto the conveyor belt 3.1 to 3.3, it falling down almost horizontally.

Preferably sensors, for instance light barriers, are provided at the transfer point on the conveyor belts 3.1 to 3.3, they determining whether sausages which are too short or are broken are delivered. These sausages are then removed from the conveyor belts 3.1 to 3.3, for instance blown or pushed off.

Adjoining the conveyor belt 3 or 3.1 to 3.3 there is an endless belt 75 in a collecting station 5.1 which, as shown in FIGS. 6–7, may also consist of several parts 75.1 and 75.2. This endless belt 75 or the parts 75.1 and 75.2 are provided with partition walls 77 which form individual compartments to receive sausages 1. Furthermore, the endless belt 75 or the parts 75.1 and 75.2 is/are conducted around corresponding deflection rollers 78.1, 78.2 and 78.3 and conducted over guide rollers 79.1 to 79.3. The deflection rollers 78.1 to 78.3 are arranged in a triangle so that an ascending plane 80 and a descending plane 81 result for the collecting station 5.1 and the endless belt 75. The deflection rollers 78.1 to 78.3 are arranged on a triangular frame 82, the deflection rollers 78.1 and 78.2 being extendable telescopically. In this way, and by means of a further pressing roll 83, the clamping of the endless belt 75 can be varied or a changed guidance of the endless belt 75 can be compensated for.

The descending plane 81 of the endless belt 75 is associated with the shaft 84. This shaft consists preferably, at least at its lower plane, of spaced guide bars 85 which are arranged on the side of the endless belt 75 or also between the parts 75.1 and 75.2 of the endless belt 75. In this connection, the parts of the endless belt 75.1 and 75.2 together with the partition walls 77 are so guided between the guide bars 85 that the sausages 1 can be transferred into the shaft 84.

The outer limitation of the shaft is formed either by a metal sheet or else by guide bars 86 which are preferably arranged parallel to each other but, however, are arranged over both the ascending plane and over the descending plane 81 or the other guide bars 85.

In order to determine the filled height of the shaft 84, sensors 87.1 to 87.3 which determine the presence of the sausages in the shaft 84 are arranged at distances from each other. Depending on the desired height of filling of the shaft 84, clamping devices 88.1 to 88.3 can now be moved against the descending plane 81 of the endless belt 75 so that this endless belt leaves the shaft 84 as from a certain desired height. In FIG. 7, the endless belt 75 is guided still up to the clamping device 88.2. The clamping device 88.3, on the other hand, is in the retracted state. In this way, the sausages are prevented from moving over too long a length of fall in the shaft 84.

From the shaft 84, the sausages pass into the collecting trough 56 of a packaging device 7.1. In the embodiment shown in FIG. 6, each sausage in the collecting trough 56 has a push cylinder 89 of its own associated with it, so that it can be precisely determined what sausages, and how many, pass onto a subsequent circular switch table 90. On this circular switch table 90 the sausages 1 turn also to a station 91 in which they are packed in a plastic bag 8 in the manner described above.

What is claimed is:

1. A device for aligning elongated objects, which comprises:

two belt or chain runs moving in opposite directions, said runs being generally arranged approximately parallel to each other and including a space between said runs for the elongated objects to fall through, wherein said runs are part of an endless chain that travels around two spaced rollers;

a conveyor belt receiving said elongated objects from said runs;

a collecting station for receiving and collecting said elongated objects from said conveyor belt;

a further processing station for further processing said elongated objects from said collecting station; and a transfer means for transfer of said elongated objects from said collecting station to said further processing station.

2. A device according to claim 1, wherein said runs comprise a set of belt or chain runs, and including at least two of said sets moving essentially parallel to each other which define at least three of said spaces for objects to fall through, with one space between runs of each set and one space between runs of adjacent sets.

3. A device according to claim 1, wherein said runs are generally horizontally arranged.

4. A device according to claim 1, wherein said conveyor belt includes means to align said elongated objects.

5. A device according to claim 1, wherein said further processing station is a packaging station.

6. A device according to claim 5, wherein said packaging station includes a packaging device which has a collecting trough with which at least one pusher movable transverse to the direction of transport (x) is associated.

7. A device according to claim 6, including a slot provided opposite said pusher.

8. A device according to claim 7, wherein the slot is formed by two shells, and a packaging element is pushed over said shells.

9. A device according to claim 8, wherein at least one of said shells is movable with respect to the other of said shells.

10. A device according to claim 6, wherein said collecting trough has a vertically movable cover associated therewith.

11. A device according to claim 6, wherein said elongated objects are sausages, and including a rotary flap for stripping the sausages from a transfer table is associated with the collecting trough.

12. A device according to claim 6 including a separate pusher associated with each elongated object.

13. A device according to claim 1, wherein said elongated objects are sausages.

14. A device according to claim 12, including an alignment means for the end alignment of the sausages downstream of the belt or chain runs, a collecting station downstream of the alignment means, and a packaging device downstream of said collecting station.

15. A device according to claim 1, wherein the space between the belt or chain runs is limited by shaft walls.

16. A device according to claim 1, wherein said conveyor belt is provided laterally with elevated edge ledges.

17. A device according to claim 1, including guides for guiding said runs.

18. A device according to claim 1, wherein at least one of said rollers is driven.

19. A device according to claim 1, wherein a plurality of said runs are arranged essentially parallel to each other on a frame, and a plurality of said rollers are provided driven jointly by one drive.

20. A device according to claim 1, including a stripper plate associated with the conveyor belt for stripping an elongated object lying on another elongated object.

21. A device according to claim 20, wherein said stripper plate is vertically adjustable.

22. A device according to claim 1, including a pressing roll which extends over the conveyor belt and is associated with a front end region of the conveyor belt.

23. A device according to claim 1, wherein the conveyor belt is inclined.

24. A device according to claim 23, wherein the inclination of the conveyor belt is adjustable.

25. A device for aligning elongated objects, which comprises:

two belt or chain runs moving in opposite directions, said runs being generally arranged approximately parallel to each other and including a space between said runs for the elongated objects to fall through wherein said runs are part of an endless chain that travels around spaced rollers;

a conveyor belt receiving said elongated objects from said runs;

a collecting station for receiving and collecting said elongated objects from said conveyor belt;

a further processing station for further processing said elongated objects from said collecting station;

a transfer means for transfer of said elongated objects from said collecting station to said further processing station; and wherein a plurality of said runs are arranged parallel to each other on a frame, and a plurality of said rollers are provided driven jointly by one drive, and including strippers associated with the belt or chain runs.

26. A device according to claim 25, wherein said strippers are of different lengths.

27. A device for aligning elongated objects, which comprises:

two belt or chain runs moving in opposite directions, said runs being generally arranged approximately parallel to each other and including a space between said runs for the elongated objects to fall through;

a conveyor belt receiving said elongated objects from said runs;

a collecting station for receiving and collecting said elongated objects from said conveyor belt;

a further processing station for further processing said elongated objects from said collecting station;

a transfer means for transfer of said elongated objects from said collecting station to said further processing station; and wherein said further processing station is a packaging station and wherein said packaging station includes a packaging device which has a collecting trough with which at least one pushes movable transverse to the direction of transport (x) is associated, and including a circular switch table arranged behind the collecting trough.

* * * * *